(12) United States Patent
Tomaszewski et al.

(10) Patent No.: US 9,274,709 B2
(45) Date of Patent: Mar. 1, 2016

(54) INDICATORS FOR STORAGE CELLS

(75) Inventors: Richard J Tomaszewski, Magnolia, TX (US); Michael S Bunker, Tomball, TX (US); Jeff W Wolford, Spring, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 170 days.

(21) Appl. No.: 13/435,106

(22) Filed: Mar. 30, 2012

(65) Prior Publication Data
US 2013/0262796 A1 Oct. 3, 2013

(51) Int. Cl.
*G06F 12/00* (2006.01)
*G06F 3/06* (2006.01)
*G06F 11/10* (2006.01)
*G06F 12/02* (2006.01)

(52) U.S. Cl.
CPC ........... *G06F 3/061* (2013.01); *G06F 3/0632* (2013.01); *G06F 3/0674* (2013.01); *G06F 11/1092* (2013.01); *G06F 12/0246* (2013.01)

(58) Field of Classification Search
CPC .................................................. G06F 12/0246
USPC .................. 711/156, 166, 151, 103, 104
See application file for complete search history.

(56) References Cited

U.S. PATENT DOCUMENTS

| | | | |
|---|---|---|---|
| 5,581,723 A * | 12/1996 | Hasbun et al. | 711/103 |
| 5,822,782 A | 10/1998 | Humlicek et al. | |
| 5,933,592 A | 8/1999 | Lubbers et al. | |
| 7,321,959 B2 * | 1/2008 | Honda et al. | 711/156 |
| 7,743,171 B1 * | 6/2010 | Hwang et al. | 710/5 |
| 7,979,773 B2 | 7/2011 | Therene et al. | |
| 8,351,290 B1 * | 1/2013 | Huang et al. | 365/218 |
| 2003/0221049 A1 * | 11/2003 | Oguri et al. | 711/104 |
| 2005/0076260 A1 | 4/2005 | Hung | |
| 2006/0195657 A1 | 8/2006 | Tien et al. | |
| 2007/0294565 A1 | 12/2007 | Johnston et al. | |
| 2009/0094421 A1 * | 4/2009 | Lewis | 711/154 |
| 2009/0271641 A1 * | 10/2009 | Rothman et al. | 713/300 |
| 2010/0030992 A1 * | 2/2010 | Fienblit et al. | 711/166 |
| 2013/0013869 A1 * | 1/2013 | Berezecki | 711/151 |

* cited by examiner

*Primary Examiner* — Adam M Queler
*Assistant Examiner* — Trang Ta
(74) *Attorney, Agent, or Firm* — Hewlett Packard Enterprise Patent Department

(57) ABSTRACT

Techniques for indicators for storage cells are provided. In one aspect, an indicator is provided that indicates if a portion of storage cells of a storage device contains a pre-defined value. In another aspect, a range of storage cells are initialized to a known value. An indicator may be set to indicate the range of storage cells has been initialized to the known value. In yet another aspect, a request for the indicator may be sent to a storage device. Based on the indicator, initialization of the storage device may be bypassed.

10 Claims, 6 Drawing Sheets

INDICATORS FOR STORAGE CELLS

BACKGROUND

Modern computing devices are typically equipped with or have access to persistent storage mechanisms. Some examples of persistent storage mechanisms include hard disk drives (HDD) and solid state disk drives (SSDD). These persistent storage devices allow for data to be maintained even during periods of time when the computing device is not operational. In addition, persistent storage may be used as an extension of a computing device's internal memory.

A typical persistent storage device may include a plurality of storage cells. These storage cells, at the most basic level, may store an individual bit, and as such, may contain the values zero or one. In the case of a HDD, this value may be stored on a magnetic disk. In the case of a SSDD, the value may be stored in an individual memory cell. Storage cells may also be aggregated for access. Typically, individual storage cells are not accessed directly. For example, multiple bits may be combined into a byte. Multiple bytes may be aggregated to form a block. Values are then written to the bytes or blocks, depending on the level of aggregation. The values may be written, retrieved, and erased, and may remain persistent even when the associated computing device is not operational.

DETAILED DESCRIPTION

Figure 1A:
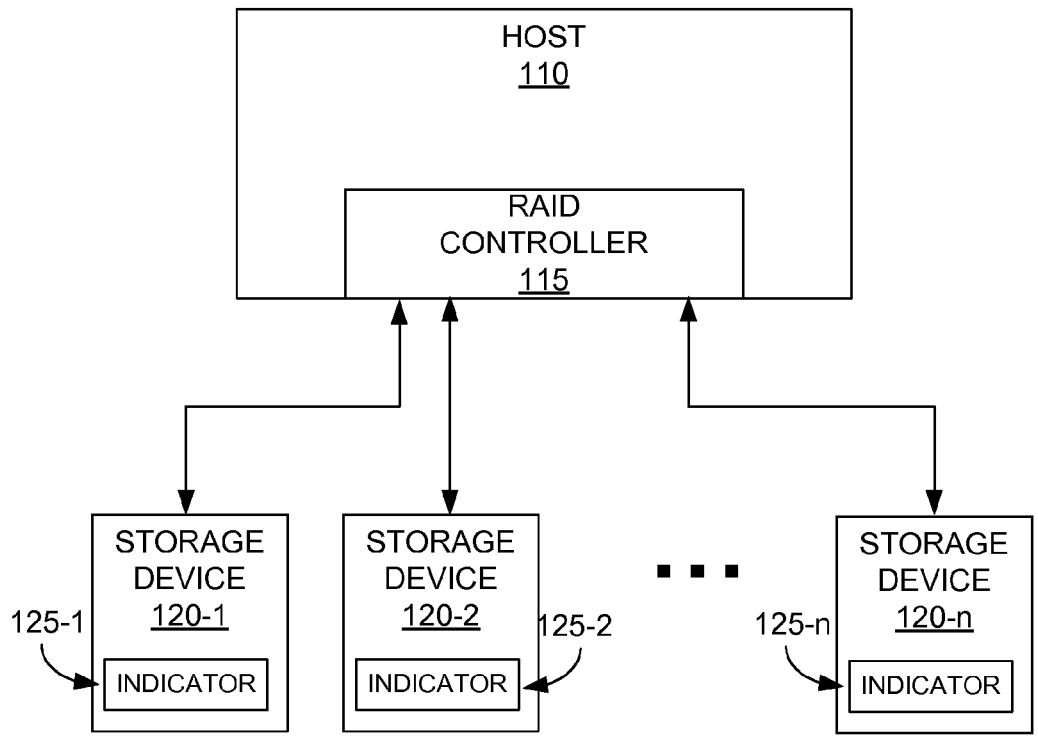
FIGS. 1(a-b) depict examples of systems.

There are many situations when it may be desirable to have all storage cells of a storage device initialized to a known value. One such example is in the case of a redundant array of inexpensive disks (RAID) array. In a simplified description of a RAID array, a RAID controller may arrange the data to be stored amongst the storage devices of the RAID array such that failure of any given storage device does not result in the loss of data. For example, consider a RAID array made up of three storage devices. The RAID controller may arrange the data such that the sum of the value of storage cells on the first and second drive is stored on the third drive. For example, if storage cell 1 on the first storage device stores the value X, and storage cell 1 on the second storage device stores the value Y, then storage cell 1 on the third storage device stores the value X+Y. As should be clear, if any one of the storage devices were to fail, the data that is lost may be recomputed through simple mathematical manipulation. Thus, when the failed storage device is replaced, the lost data may be recreated based on the data from the storage devices that have not failed.

In the case of setting up a new RAID array, it may be useful to have the storage devices all initialized to a known, pre-defined value, such as zero. The reason this is useful is that if all storage cells contain the value zero, then the sum of the storage cells will also be zero. Following the example above, if the cells of the first and second storage device all contain the value zero, then the sum would also be zero. Because the storage cells of the third storage device are also all zero, there is no need to take any further action.

A problem may arise when attempting to ensure that the storage cells of a storage device are all initialized to a known, pre-defined value, such as zero. Based on the summation technique above, it should be clear that it cannot be assumed that a storage device has been initialized to zero, because if the assumption is wrong, the RAID array will not function properly. To ensure that the storage device is initialized to zero, an initialization process may be performed, wherein a zero is written to all storage cells. However, given the ever increasing sizes of storage devices, such an initialization can take a long period of time. For example, hard disk drives in the range of 1-2 terra bytes are commonly available. Initialization of a hard disk drive of that size may take on the order of several hours to complete. During the time wasted by the initialization, the RAID array cannot be used to store data.

The techniques described herein overcome the problem of wasted initialization time through the use of an initialization indicator. A storage device may have its storage cells initialized with a known, pre-defined value, such as zero. Once the initialization is complete, an indicator may be set to verify that the initialization has been performed. The storage device may then monitor any data that is written to the storage device. If any data is written, the initialization of the storage device has been corrupted, and thus can no longer be verified. The indicator may then be cleared. The process of initialization and setting the indicator may be part of the manufacturing process of the storage device. In other implementations, the initialization process may occur prior to setting up the RAID array.

When it is time to set up a RAID array, the RAID controller may retrieve the indicator from the storage device. If the indicator is set, this means that the initialization of the storage device can be verified, thus there is no need to initialize the storage device. Bypassing the initialization of the storage device may save several hours in the process of setting up the RAID array. In the case where the indicator is not set, the initialization of the storage device cannot be verified and the initialization may not be bypassed.

Techniques described herein also allow for a storage device to be divided into multiple ranges, with an initialization indicator for each range. For example, storage devices are typically addressed with logical block addresses. An indicator may be provided for a range of logical block addresses (LBA). When the indicator is set, it can be ensured that all storage cells within the range of LBA contain the known initialization value. Thus, initialization of that range of LBA can be bypassed. By segmenting the storage cells into ranges, the initialization time may be decreased, because only those ranges that cannot be verified as already having been initialized need be initialized.

Figure 1B:
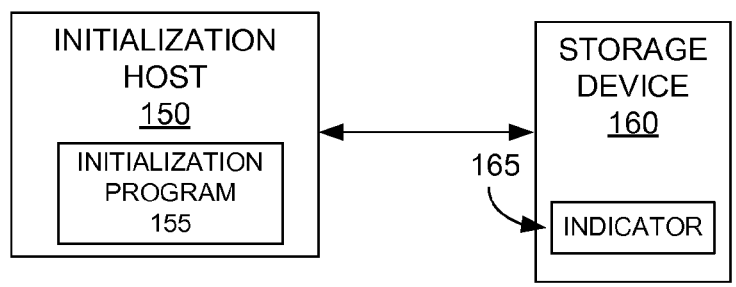

FIGS. 1(a-b) depict examples of systems. FIG. 1(a) depicts an example of a system that may utilize the techniques described herein. As described above, one such system that may utilize the techniques described herein is a storage mechanism that utilizes a RAID array. However it should be understood that the techniques described herein are applicable whenever verification of the initialization state of a storage device is useful.

The system shown in FIG. 1(a) includes a host 110, which includes a RAID controller 115, and a plurality of storage devices 120-1 . . . n. Each of the storage devices may include an indicator 125-1 . . . n, respectively. The host 110 may be any type of computing device that makes use of persistent storage. In one example, the host may be a server, computer that provides storage services to other computers. In another example, the host may run application programs that use persistent storage. In yet another example, the host may be a personal computer. The techniques described herein are not dependent on a host that performs any particular function, but rather any host that utilizes persistent storage is suitable.

The host may include a RAID controller 115. As mentioned above, RAID is a persistent storage mechanism that provides for improved data reliability. In some typical examples of RAID implementations, data is stored using several independent storage devices. The RAID controller manages the storage of data across the storage devices. In addition, in the case of the failure of one of the storage devices, the RAID controller is able to continue to operate just as if the failed storage device was still operational. The RAID controller may also rebuild the data stored on the failed storage device when a new, replacement storage device is installed.

The storage devices 120-1 . . . n may be storage devices in any form. For example, the storage devices may be magnetic hard disk drives (HDD) or solid state disk drives (SSDD). Although HDDs and SSDD are mentioned, techniques described herein are not dependent on any particular storage technology. Any device capable of persistent storage of data is usable with the techniques described herein. Each of the storage devices may include an indicator 125-1 . . . n. The indicator may be used to indicate if the storage device has been initialized to contain a known value. The indicator will be described in further detail below, but for purposes of description of FIG. 1(*a*), a set indicator indicates that all storage cells within the storage device contain a known pre-defined value. In the case of a RAID configuration, the known, pre-defined value may be a zero.

In operation, when first establishing a RAID array, the storage devices initially need to contain a known, pre-defined value, such as zero, in all storage cells on the storage device. The RAID controller may query each of the storage devices to determine if the indicator is set. If the indicator is set, the RAID controller is able to verify that all storage cells on the storage device contain the value zero. As such, the RAID controller does not need to initialize the storage cells on the storage device, as they are already initialized. Bypassing the initialization step may save a considerable amount of time when creating a RAID array. If the indicator is not set, the RAID controller is not able to verify the values stored in all storage cells of the storage device are zero. As such, the RAID controller would then proceed to initialize each storage cell on the storage device to the pre-defined value of zero. In some implementations, once the RAID controller has performed this initialization, it may then reset the indicator.

FIG. 1(*b*) depicts a system that may be used to set the indicator value on a storage device. The system shown in FIG. 1(*b*) may include a host 150. The host may be any type of computing system that is capable of initializing the storage cells on a storage device to a known value. For example, the host may be the same host described with respect to FIG. 1(*a*). The host 150 may be a standalone system. In some implementations, the system described in FIG. 1(*b*) is part of the storage device manufacturing process.

The host 150 may include typical computing components such as a processor and a memory. Contained within the memory may be a set of instructions forming a program 155, which when executed by the host, causes all storage cells of a storage device 160 to be initialized with a known value, such as zero. In addition, once the initialization is complete, an indicator 165 on the storage device may be set to indicate that the initialization is complete.

In operation, the host 150 may cause a storage device 160 to be initialized such that the storage cells of the storage device all contain the same, known value. In the case of storage devices that will be used in a RAID array, the known value is typically zero. In one example implementation, the host may send commands to the storage device to initialize each storage cell. Once the host has initialized all storage cells on the storage device to the known value, the host may set an indicator on the storage device to indicate that the initialization was successful. In another example implementation, the host may send a command to the storage device to instruct the device to initialize the storage cells. For example, a format unit, sanitize, or write same command may be sent to the storage device to instruct the storage device to write the known value to the storage cells. Once the command has completed, the storage device itself may set the indicator to indicate that the initialization was successful.

It should be understood that the system described in FIG. 1(*b*) may be a standalone system. For example the system may be part of the storage device manufacturing process. When a storage device is being manufactured, the device may be initialized and the indicator set. Thus, when the storage device is removed from the package, it is already initialized, and such initialization can be verified through the use of the indicator. In another example, the system described in FIG. 1(*b*) may be utilized by the end user. For example, in many cases, an organization may maintain a supply of spare storage devices. These spare storage devices may have previously been in use, and are subsequently repurposed for other uses. Because the storage devices were previously used, there is no way to verify the values contained thereon. Through utilization of a system such as the one described with respect to FIG. 1(*b*), the storage devices may be initialized to a known value. The indicator may then be used to verify that no modifications have been made to any storage cell one the storage device, because had any modifications been made, the indicator would have been cleared. Storage devices and the process of setting and clearing the indicator will be described in further detail below.

Figure 2:
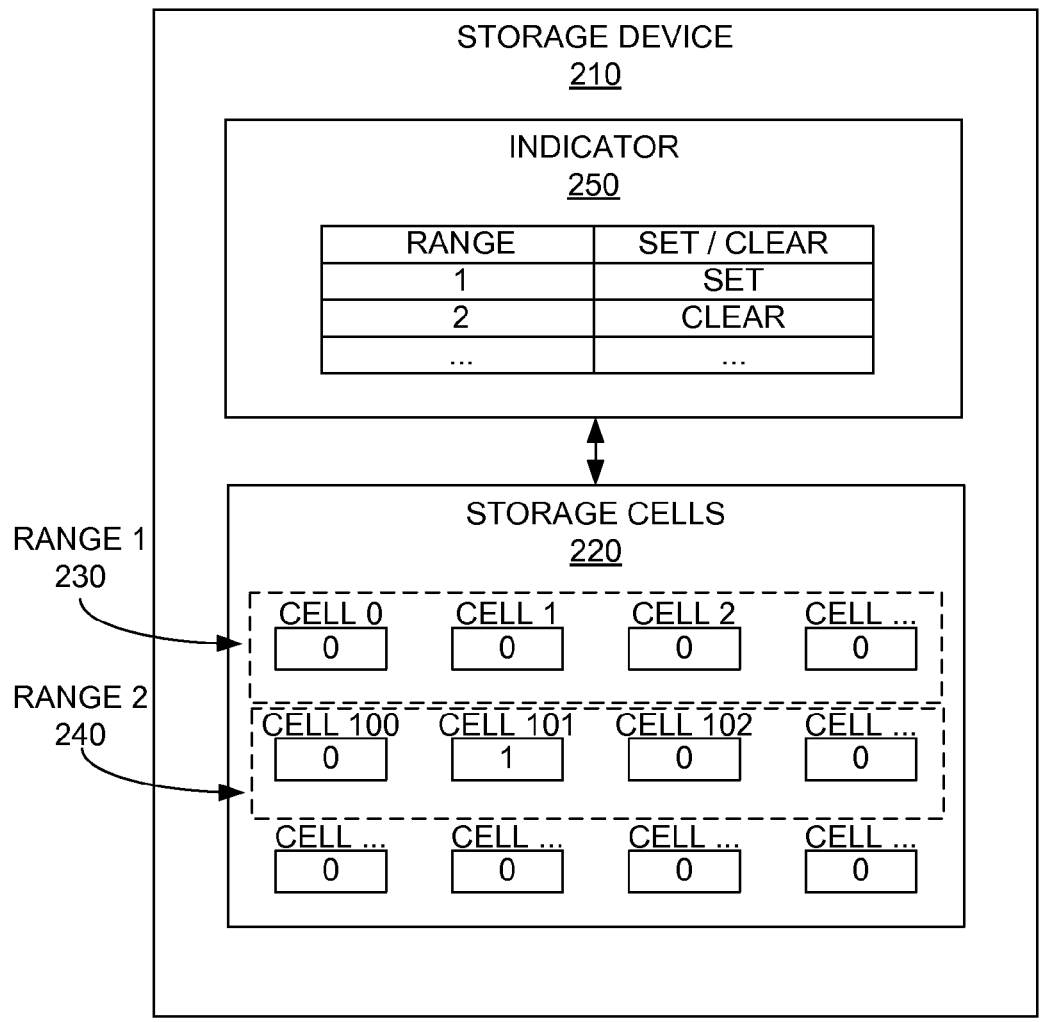
FIG. 2 depicts an example of a storage device.

FIG. 2 depicts an example of a storage device. Storage device 210 may be any type of device that is capable of persistently storing data. Some examples of storage devices may include hard disk drives and solid state disk drives. Storage device 210 may include storage cells 220. Each storage cell may store a value. In the case of a hard disk drive, the storage cells may be implemented as a location on a magnetic disk. In the case of a solid state disk drive, a storage cell may be an individual memory location within the flash memory of the solid state disk drive.

In some implementations, the storage cells may be segmented into a plurality of ranges. For example, as shown, a first range 230 may include storage cells starting at cell 0. A second range 240 may include storage cells starting at cell 100. The particular numbering of the storage cells is for purposes of explanation only. What should be understood is that the storage cells may be divided into portions. However, in some implementations, all of the storage cells within the storage device may be treated as a single range. As explained above, segmenting the storage device into ranges may be useful to bypass initialization of storage cell ranges that do not require initialization.

The storage device may also include indicator 250. The indicator, which may also be referred to as an initialization indicator, may be used to indicate if a range of storage cells are all initialized to a known, pre-defined value, such as zero. A separate indicator may be provided for each range on the storage device. As shown, in range 230, all of the values stored are zero. As such, the indicator 250 for range one is set. Range 240 has at least one value, in cell 101, that is not zero. As such, the indicator for range two is not set, or in other words, is clear. As explained above, the indicator may be used to determine if initialization for a range of storage cells is needed.

Figure 3:
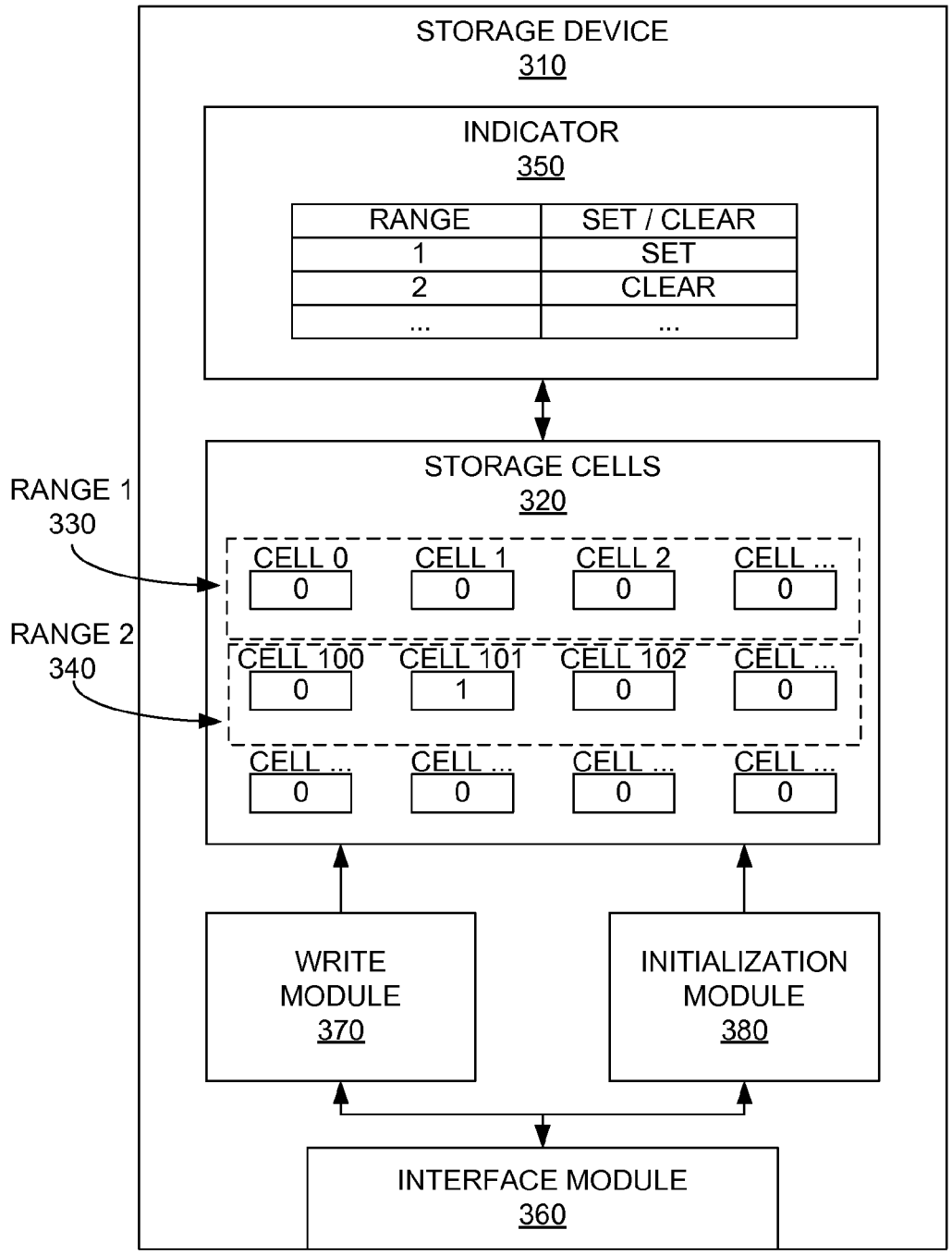
FIG. 3 depicts another example of a storage device.

FIG. 3 depicts another example of a storage device. The storage device 310 includes storage cells 320 and indicator 350. The description of these elements is generally the same as the elements with similar reference numbers in FIG. 2. In addition to the elements described in FIG. 2, the storage device in FIG. 3 may also contain an interface module 360, a write module 370, and an initialization module 380.

The interface module 360 may allow the storage device to communicate with external devices. For example, in the case of a RAID array, the RAID controller may communicate with the storage device via the interface module. The interface module may receive commands from the RAID controller and report the results of those commands to the RAID controller. For example, the indicator 350 may be stored in a mode page on the storage device. The interface module may receive a mode sense command from the RAID controller to query the status of the indicator. The storage device, through the interface module, may then respond to the mode sense command with the status of the indicator.

The storage device may also include a write module 370. The write module may receive commands from external sources through the interface module. The commands may instruct the write module to write data to the storage cells. The write module may monitor all write commands. In some implementations, the write module may clear the indicator for the range of storage cells upon writing any value to a storage cell within the range of storage cells. In other implementations, the write module may monitor all write commands and will clear the indicator for a range if a value other than the known, pre-defined value is written to a storage cell within the range. Regardless of implementation, the write module generally clears the indicator for a range once data has been written to a storage cell within the range and it cannot not be verified that the storage cells within the range all contain the known, pre-defined value.

The initialization module 380 may be used to initialize the storage cells within a range to a known, pre-defined value. In some cases, the initialization module may receive instructions from the RAID controller for each individual storage cell, and will initialize each storage cell. In other cases, the initialization module may receive a single command, such as a Write Same command, which instructs the initialization module to write the same value to multiple storage cells. In either case, the initialization module may initialize a range of storage cells to a known, pre-defined value. Upon completion of the initialization task, the initialization module may set the indicator for the range of storage cells. A set indicator may be used by the RAID controller to verify that the range of storage cells all contains the known, pre-defined value. The reason for this is that any attempt to write a value other than the known value to a storage cell would go through the write module. As explained above, the write module may clear the indicator if it cannot be confirmed that the value written is anything other than the known value.

Figure 4:
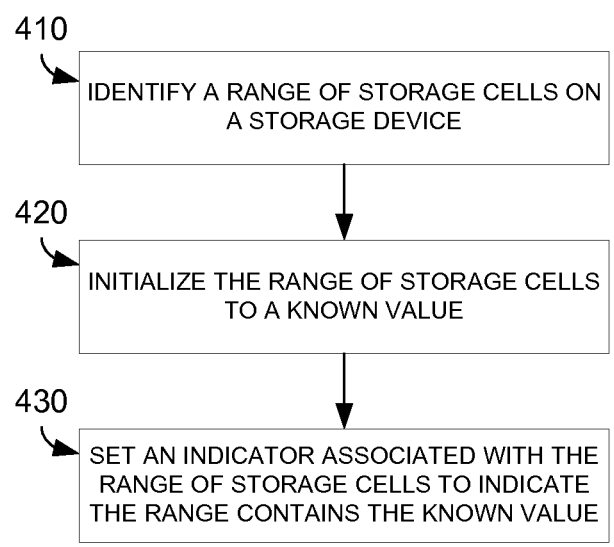
FIG. 4 depicts an example of a flow diagram for setting an initialization indicator.

FIG. 4 depicts an example of a flow diagram for setting an initialization indicator. In block 410, a range of storage cells on a storage device may be identified. As described above, the range of storage cells may be a portion of all of the storage cells on the storage device. The range may also include all of the storage cells on the storage device. In block 420, the range of storage cells may all be initialized with the known, pre-defined value. Thus, all of the storage cells within the range will contain the same value. Typically, the value may be zero.

In block 430, an indicator associated with the range of storage cells may be set. Setting the indicator indicates that the range of storage cells contains the known value. Thus, when the indicator is set, it can be ensured that all storage cells within the range contain the known value. The information conveyed by the indicator may be used to bypass additional initialization steps, as will be described in further detail with respect to FIG. 5.

Figure 5:
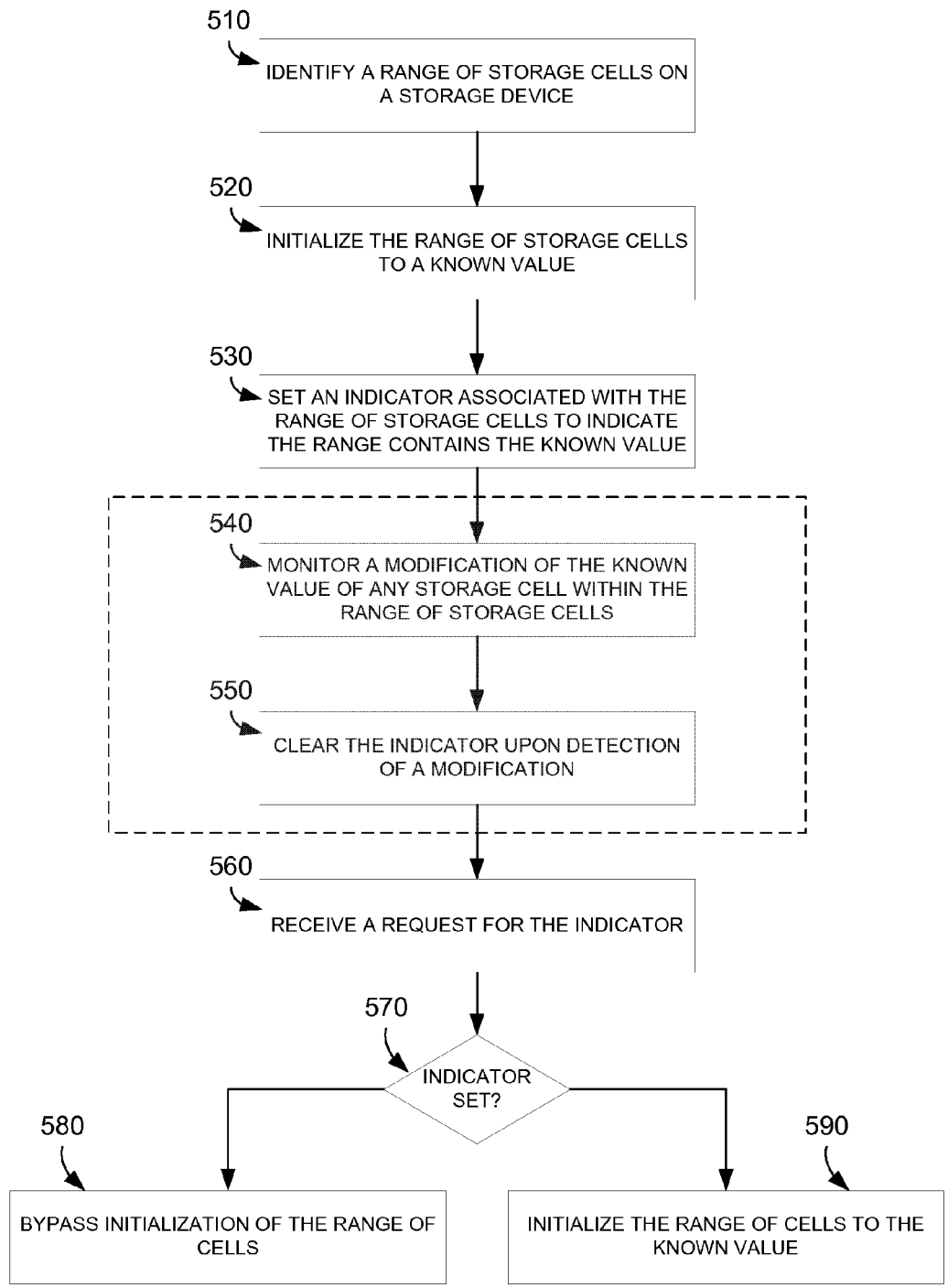
FIG. 5 depicts another example of a flow diagram for setting an initialization indicator.

FIG. 5 depicts another example of a flow diagram for setting an initialization indicator. Just as above, in block 510, a range of storage cells on a storage device may be identified. In block 520, the range of storage cells may be initialized to a known value. In block 530, an indicator may be set to indicate the range of storage cells contains the known value.

In block 540, modification of the known value in any storage cell in the range of storage cells may be monitored. In block 550, the indicator may be cleared upon the detection of a modification. Blocks 540 and 550 may be repeated in a loop as long as the storage device is operational, as is indicated by the dashed line surrounding those two blocks. In other words, the storage cells within the range are continuously monitored. Any change to a value in any of the storage cells may cause the indicator to be cleared, as once there has been a modification to any storage cell within the range, the range is no longer certified as containing the known value.

In block 560, a request for the indicator may be received. The request may come from any source that wishes to verify the initialization state of a range of storage cells on the storage device. As described above, in one example implementation, the request may come from a RAID controller to determine if all storage cells within the range contain the known, pre-defined value. In block 570, it may be determined if the indicator is set.

If the indicator is not set, the process moves to block 580. In block 580, it has been verified that all storage cells within the range of storage cells contain the known value, because otherwise the indicator would not be set. As such, initialization of the range of cells is bypassed. If it is determined that the indicator is not set, the process moves to block 590. In block 590, the range of storage cells may be initialized to the known value. If the indicator is not set, the initialization is performed to ensure that all storage cells within the range of storage cells contain the known value.

Figure 6:
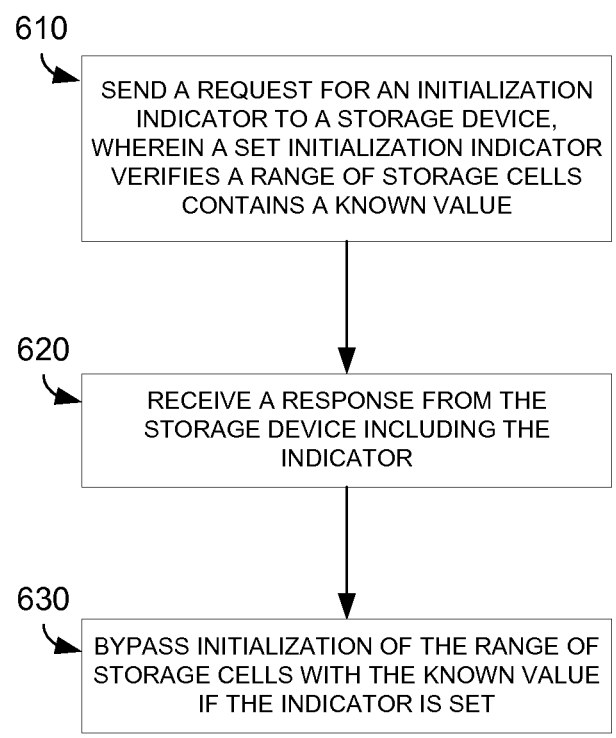
FIG. 6 depicts an example of a flow diagram for using an initialization indicator.

FIG. 6 depicts an example of a flow diagram for using an initialization indicator. For example, the process described in FIG. 6 may be used by a RAID controller to determine if initialization of a range of storage cells of a storage device is needed. In block 610, a request for an initialization indicator may be sent to a storage device. A set initialization indicator may verify that a range of storage cells contains a known value. Likewise, a clear indicator may indicate that it cannot be verified that a range of storage cells contains the known value.

In block 620, a response may be received from the storage device. The response may include the indicator. For example, the response may include if the indicator is set or cleared. In block 630, initialization of the range of storage cells to the known value may be bypassed if the indicator is set. The reason the initialization may be bypassed is that the set indicator indicates that there has been no modification from the known value in any storage cell within the range from the time the storage cells were initialized with the known value. Any such modification would have caused the indicator to be cleared, and as such, initialization could not be bypassed.

We claim:

1. A device comprising:
a range of storage cells, each storage cell to store a respective value;
an initialization indicator which,
   when set, indicates the storage cells of the range can be verified to be in an initialization state in which each of the storage cells contains a respective known value, and
   when clear, indicates the storage cells of the range cannot be verified to be in the initialization state;
an initialization module to initialize the storage cells, and to set the initialization indicator upon initializing the storage cells; and
a write module to write data to the storage cells, and, once data is written to a storage cell of the range, to clear the initialization indicator.

2. A method comprising:
identifying a range of storage cells on a storage device;
initializing the range of storage cells to an initialization state in which each of the storage cells contains a respective known value;
in response to the initializing, setting an initialization indicator associated with the range of storage cells to indicate that the range of storage cells can be verified to be in the initialization state;
writing values to storage cells within the range of storage cells; and
in response to the writing, clearing the initialization indicator to indicate that it cannot be verified that the range of storage cells is in the initialization state.

3. The method of claim 2 further comprising:
monitoring a modification of the known value of any storage cell within the range of storage cells; and
clearing the initialization indicator upon detection of the modification.

4. The method of claim 3 wherein the range of storage cells is all storage cells on the storage device.

5. The method of claim 3 further comprising:
receiving a request for the initialization indicator; and
bypassing initialization of the range of storage cells associated with the initialization indicator if the initialization indicator is set.

6. The method of claim 5 further comprising initializing the range of storage cells to the known value if the initialization indicator is not set.

7. A method comprising:
sending a request for an initialization indicator to a storage device, wherein,
   an initialization indicator, when set, verifies a range of storage cells is in an initialization state in which each of the storage cells contains a respective known value, and
   the initialization indicator, when clear, indicates that it cannot be verified that the storage cells contain the respective known value;
receiving a response from the storage device including the indicator;
determining whether the indicator is set or clear; and
   in response to a determination that the initialization indicator is set, bypassing initialization of the range of storage cells, and
   in response to a determination that the initialization indicator is cleared, initializing the range of storage cells.

8. The method of claim 7 wherein the initialization indicator is set during the manufacturing process.

9. The method of claim 7 wherein the initialization indicator is set using a computer program that initializes the range of storage cells to the known value and sets the indicator.

10. The method of claim 7 wherein the range of storage cells is all storage cells on the storage device.

* * * * *